(12) United States Patent
Klassen (10) Patent No.: US 9,219,703 B2
(45) Date of Patent: Dec. 22, 2015

(54) HANDLING NOTIFICATIONS IN INSTANT MESSAGING SYSTEMS

(75) Inventor: Gerhard Dietrich Klassen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 879 days.

(21) Appl. No.: 13/238,839

(22) Filed: Sep. 21, 2011

(65) Prior Publication Data

US 2012/0011213 A1 Jan. 12, 2012

Related U.S. Application Data

(62) Division of application No. 11/459,047, filed on Jul. 21, 2006.

(51) Int. Cl.
H04M 1/64 (2006.01)
H04L 12/58 (2006.01)
H04M 1/725 (2006.01)

(52) U.S. Cl.
CPC .............. H04L 51/04 (2013.01); H04L 12/581 (2013.01); H04L 12/5875 (2013.01); H04L 51/30 (2013.01); H04M 1/72547 (2013.01)

(58) Field of Classification Search
CPC ............ H04M 19/04; H04M 1/72552; H04M 1/72547; H04L 51/04
USPC ............ 379/88.12, 88.13; 709/202, 206, 224, 709/248; 719/318; 455/466
See application file for complete search history.

(56) References Cited

U.S. PATENT DOCUMENTS

| | | | |
|---|---|---|---|
| 2001/0054115 A1 | 12/2001 | Ferguson et al. | |
| 2002/0026483 A1 | 2/2002 | Isaacs et al. | |
| 2003/0212673 A1 | 11/2003 | Kadayam et al. | |
| 2003/0217096 A1 | 11/2003 | McKelvie et al. | |
| 2004/0205775 A1* | 10/2004 | Heikes et al. | 719/318 |
| 2005/0005008 A1 | 1/2005 | Glasser et al. | |
| 2005/0080868 A1* | 4/2005 | Malik | 709/207 |
| 2006/0168049 A1* | 7/2006 | Orozco et al. | 709/206 |
| 2006/0173966 A1 | 8/2006 | Jennings, III et al. | |
| 2007/0185847 A1 | 8/2007 | Budzik et al. | |
| 2007/0239898 A1 | 10/2007 | Friend et al. | |

(Continued)

FOREIGN PATENT DOCUMENTS

EP 1 492 033 A2 12/2004

OTHER PUBLICATIONS

USPTO: Office Action dated Nov. 10, 2011 for U.S. Appl. No. 11/459,047 (13 pages).

(Continued)

*Primary Examiner* — Md S Elahee
(74) *Attorney, Agent, or Firm* — Jeffrey N. Giunta; Fleit Gibbons Gutman Bongini & Bianco P.L.

(57) ABSTRACT

To reduce the communications in an IM conversation between two devices, two or more IM events of the conversation at the first device are confirmed by sending to the second device a single IM communication that confirms the most recent of the events. In order that the user of the second device not experience undue delay in receiving the confirmation, the method may be applied where the time interval between any two consecutive ones of the events is less than a predetermined time.

18 Claims, 10 Drawing Sheets

(56) References Cited

U.S. PATENT DOCUMENTS

2008/0037722 A1  2/2008 Klassen
2009/0191864 A1  7/2009 Mousseau et al.

OTHER PUBLICATIONS

Strobeck, Anders: Examination Report for EP 06117626.9, Jun. 12, 2007.

Strobeck, Anders: "EESR" Extended European Search Report for EP 06117626.9, Dec. 28, 2006.

Isomaki M et al: "Advanced Instant Messaging Requirements for the Session Initiation Protocol (SIP)" IETF Standard-Working-Draft, Internet Engineering Task Force, IETF, CH, vol. simple, Jun. 22, 2006, XP015045939 ISSN: 0000-0004 (11 pages).

CIPO: Requisition by the Examiner (Office Action) for Patent Application No. 2594817 dated Jun. 1, 2011 (6 pages).

Non Final Office Action dated Apr. 17, 2015 received for U.S. Appl. No. 14/045,039.

\* cited by examiner

HANDLING NOTIFICATIONS IN INSTANT MESSAGING SYSTEMS

CROSS-REFERENCE TO RELATED APPLICATIONS

This application is a divisional of U.S. application Ser. No. 11/459,047, which was filed on Jul. 21, 2006. The entire disclosure and the drawing figures of this prior application is hereby incorporated by reference.

BACKGROUND

Instant messages are short text messages with no subject and no attachments sent directly from terminal to terminal within an instant messaging (IM) community. The messages are generally displayed to the user as part of a conversation. A member of an instant messaging (IM) community has a unique identifier ("contact name") in that community and can be added to the contact list of another member of the community using that identifier. For example, SMS is available only within the community of mobile telephone users, and the unique identifier is the telephone number.

A user receiving an IM message to his communication device may type and send a response to the message. However, it may take some time for the user to notice the received message, to read it and to type and send the response. If the user is not available to receive the message, the sender of the message may wait a long time for a response before realizing that the user has not participated in the conversation.

Some IM systems use notifications to provide users with "clues" about the status of a conversation. For example, a Message_Delivered notification may be used to notify a sender of a message that the message was received by the target communication device. In another example, a Message_Read notification may be used to notify a sender of a message that the message was read by a user of the target communication device. In yet another example, Typing_Started and Typing_Stopped messages may be used to notify a sender of a message when a user of the target communication device is typing a response to the message.

Notifications sent in an IM system occupy bandwidth that would otherwise be available for other communications.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Notifications sent in an IM system occupy bandwidth that would otherwise be available for other communications. The various notifications may include one or more of Message_Delivered, Message_Read, Typing_Started and Typing_Stopped.

Reducing the communications in an IM conversation between two devices may be accomplished by confirming two or more IM events of the conversation at the first device by sending to the second device a single IM communication that confirms the most recent of the events. In order that the user of the second device not experience undue delay in receiving the confirmation, the method may be applied where the time interval between any two consecutive ones of the events is less than a predetermined time. The predetermined time may be configurable to the behavioral pattern of the user of the first device, or to any other parameters, in order to balance between giving the user of the first device enough time to respond and delaying the notifications for too long. The predetermined time may be, for example, in the range of approximately 5 seconds to approximately 10 seconds.

In some cases, an earlier event can be inferred from the single IM communication. For example, the first device may delay sending a Typing_Started (and/or Typing_Stopped) notification for a brief period of time and may avoid sending the Typing_Started (and/or Typing_Stopped) notification if the IM being typed is sent to the second device during that period of time, since the user of the second device receiving the IM can infer from the receipt of the IM that it was typed. This may occur, for example, with very short instant messages such as "OK". In such a scenario, the most recent of the events being confirmed is that an IM was sent by the first device to the second device, the single IM communication is the IM, and an earlier one of the events is the starting (or stopping) of input of the IM by a user of the first device.

In another example, the first device may delay sending a Message_Delivered notification for a particular IM for a brief period of time and may avoid sending the Message_Delivered notification if the user of the first device has read the particular IM during that period of time, since the user of the second device participating in the instant messaging conversation can infer from a Message_Read notification (or a combination notification that includes a Message_Read component) that the particular IM was indeed delivered. In such a scenario, the most recent of the events being confirmed is that an IM received from the second device was displayed on a display of the first device, the single IM communication is a notification that the IM was read, and an earlier one of the events is the receipt of the IM at the first device.

The second device, upon receipt from the first device of a Message_Delivered notification for a particular IM, may infer that all previous instant messages in the conversation that were sent by the second device to the first device have also been received by the first device. The second device may update its internal record to reflect that the particular IM and all messages of the conversation sent prior to the particular IM were delivered. In such a scenario, the most recent of the events to be confirmed is the receipt of an instant message, and earlier ones of the events are the receipt of previous instant messages in the conversation. Similarly, the second device, upon receipt from the first device of a Message_Read notification for a particular IM, may infer that all previous instant messages in the conversation that were sent by the second device to the first device have also been received by the first device and read by the user of the first device. The second device may update its internal record to reflect that the particular IM and all messages of the conversation sent prior to the particular IM were delivered and read. In such scenarios, the most recent of the events to be confirmed is the display of an instant message, and earlier ones of the events are the receipt and display of previous instant messages in the conversation.

The single IM communication may explicitly confirm one or more earlier ones of the events. For example, the first device may delay sending a Message_Delivered notification for a particular IM for a brief period of time. If a user of the first device starts typing another instant message during that period of time, then instead of sending separate Message_Delivered, Message_Read and Typing_Started notifications, the device may send a single combination notification about the particular IM having been read and typing having started. In such a scenario, the most recent of the events being confirmed is the starting of input of an instant message at the first device, and the earlier events include an instant message being received and displayed at the first device.

In another example, the first device may delay sending a Message_Read notification for a particular IM for a brief period of time. If the user of the first device starts typing another instant message during that period of time, then instead of sending separate Message_Read and Typing_Started notifications, the device may send a single combination notification about the particular IM having been read and typing having started. In such a scenario, the most recent of the events being confirmed is the starting of input of an instant message at the first device, and an earlier one of the events is the display of an instant message at the first device.

The single IM communication may include an IM and a notification of one or more of the events. For example, the first device may delay sending a Message_Read notification for a particular IM for a brief period of time. If the first device is ready to send an IM during that period of time, then instead of sending the Message_Read notification (and Typing_Started and Typing_Stopped notifications) and the instant message separately, the first device may send a single IM communication that is a combination message/notification that includes the IM composed at the first device and notifies that the particular IM was displayed at the first device. In such a scenario, an earlier one of the events is reception at the first device of an IM from the second device and the most recent of the events to be confirmed is the sending of another IM by the first device to the second device, and the single IM communication is the combination IM and notification of display.

Figure 1:
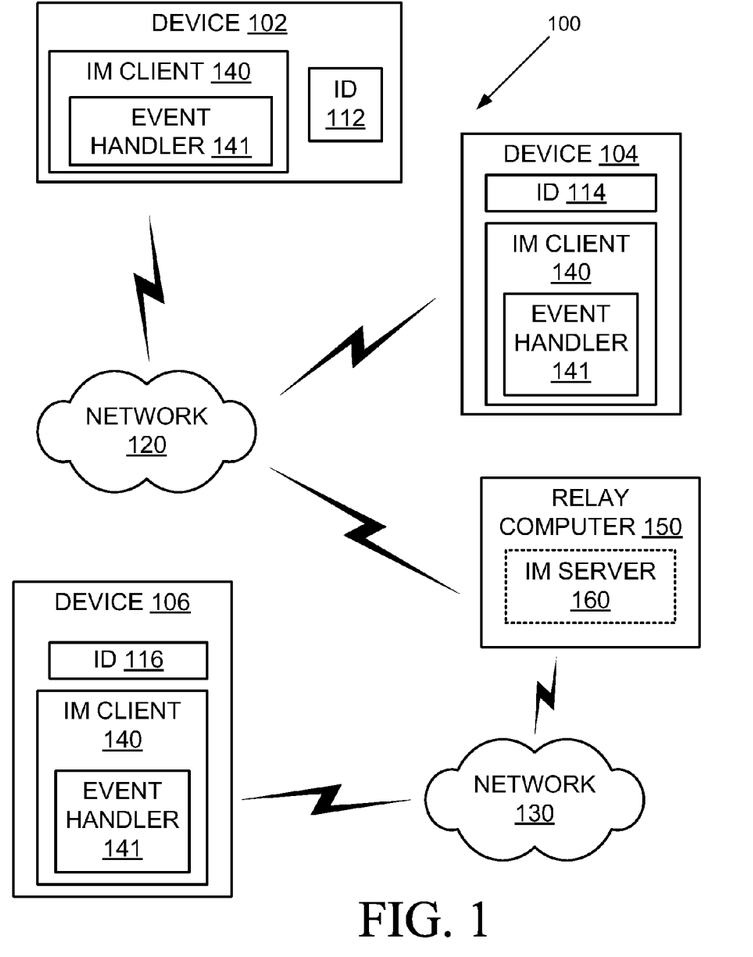
FIG. 1 is a simplified illustration of an exemplary communication system 100 used for instant messaging, according to some embodiments of the invention.
Figure 2:
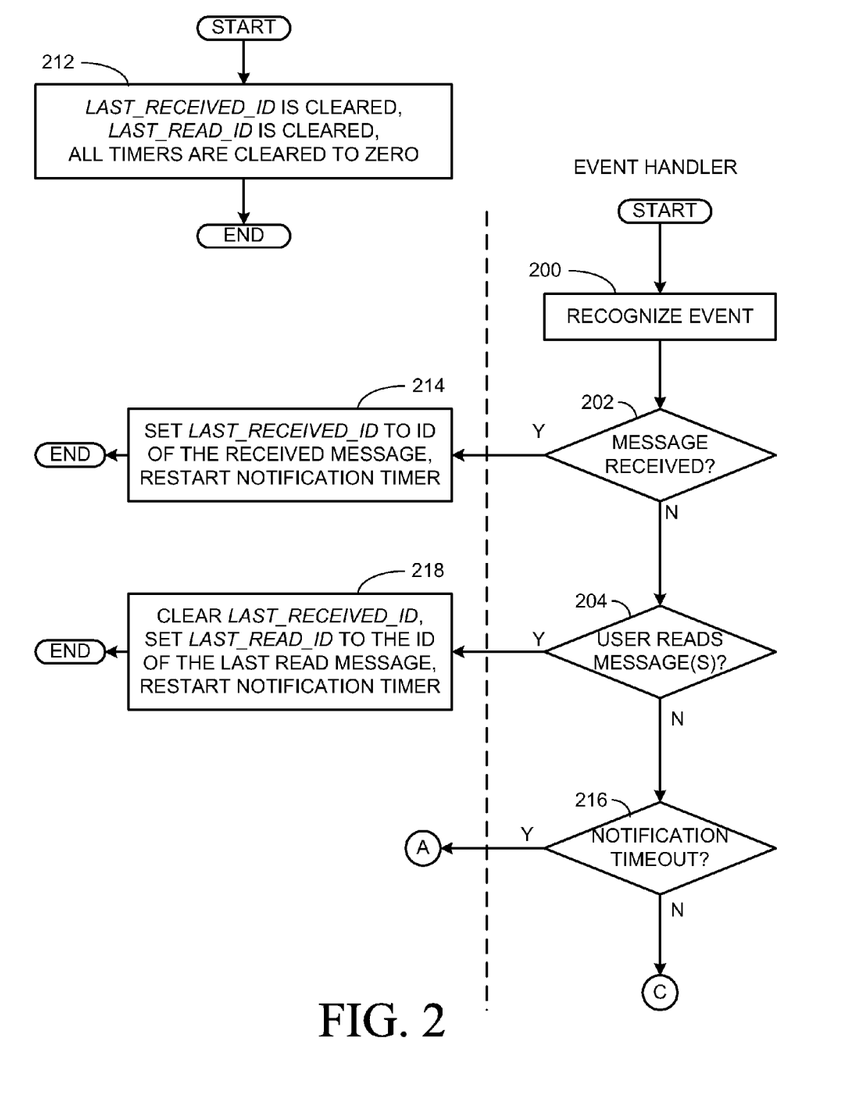
FIGS. 2-7 are a flowchart of an exemplary method implemented by an instant messaging client on a communication device receiving one or more IM messages, according to some embodiments of the invention.

FIG. 1 is a simplified illustration of an exemplary communication system 100 used for instant messaging (IM), according to some embodiments of the invention. System 100 includes devices 102, 104 and 106, respectively identified by identifiers 112, 114 and 116 in the instant messaging community. A non-exhaustive list of examples for devices 102, 104 and 106 includes workstations, notebook computers, laptop computers, desktop personal computers, personal digital assistants (PDAs), hand-held computers, cellular telephones, smart cellphones, electronic mail (Email) clients, programmable consumer electronics, network PCs, and the like.

Devices 102 and 104 communicate to each other and to other devices in the instant messaging community via a network 120, and device 106 communicates to other devices in the instant messaging community via a network 130. A non-exhaustive list of examples for networks 120 and 130 includes any or combination of:

a) wired networks such as the Internet, intranets, Ethernet networks, token rings, Universal Serial Bus (USB), wired networks according to the IEEE 1394-1995, IEEE 1394a-2000, and IEEE 1394b standards (commonly known as "FireWire"), or any combination thereof;

b) cellular networks such as Direct Sequence—Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication, and the like; and c) wireless local area networks such as IEEE 802.11, Bluetooth®, Zigbee™, ultra wideband (UWB) and the like; and d) optical communication networks.

Networks 120 and 130 may include any combination of additional communication devices (not shown) such as gateways, routers, switches, and the like.

An IM client 140 is installed on each of devices 102, 104 and 106. IM client 140 may be implemented in software, hardware, firmware or any combination thereof. IM client 140 may include an event handler 141. When the user of device 102 sends an instant message to the user of device 104, the instant message is handled by IM client 140 on device 102, communicated to network 120, communicated to a relay computer or computers 150, and passed back to network 120 for communication to device 104. When the user of device 106 sends an instant message to the user of device 104, the instant message is handled by IM client 140 on device 106, communicated to network 130, communicated to relay computer(s) 150, and passed to network 120 for communication to device 104.

An IM communication session between two communication devices is called a conversation. Messages that belong to the same conversation may include a common number identifying the conversation, and an identification number and/or a time stamp to identify each particular message in the conversation.

Relay computer(s) 150 identifies the contact through its unique identifier in the IM community and enables the instant message to be addressed to the appropriate device. If the instant message cannot be delivered to the contact's device, relay computer(s) 150 may store the instant message and attempt redelivery for a specified period of time, for example, 24 hours or 48 hours.

In some IM systems, an IM server 160 is incorporated into or coupled to relay computer(s) 150. In other IM systems, the IM functionality is enabled by IM clients 140 and no specific IM server is required.

FIGS. 2-7 are a flowchart of an exemplary method implemented by IM client 140 on a communication device receiving one or more IM messages, for example device 102, according to some embodiments of the invention. At 200, IM client 140 recognizes that an event occurred. The recognized event may be reception of a message by device 102, an activation of device 102 that corresponds to the user reading a message, an activation of device 102 that corresponds to the user typing a message, an activation of device 102 that corresponds to the user exiting the conversation screen that includes the received message, and an activation of device 102 that corresponds to the user sending a message, as shown at 202, 204, 206, 208 and 210, respectively. IM client 140 may recognize other events that are explained hereinbelow.

A conversation may be assigned variables Last_Received_ID, Last_Read_ID, Notification_Timer, Typing_Started_Timer and Typing_Stopped_Timer that are cleared to zero at the beginning of the conversation, as shown at 212.

If event handler 141 recognizes at 202 reception of a message, then at 214, IM client 140 sets Last_Received_ID to the identification number of the received message, loads Notification_Timer with a value Notification_Value, and initiates decrementing of Notification_Timer at a constant rate. The constant rate and the value of Notification_Value determine the amount of time that will pass until Notification_Timer is decremented to zero. If Notification_Timer is decremented to zero, event handler 141 may recognize that event, as shown at 216.

If event handler 141 recognizes at 204 activation of device 102 that corresponds to the user reading one or more messages, then at 218 IM client 140 may clear Last_Received_ID to zero, may set Last_Read_ID to the identification number of the last message being read, reload Notification_Timer with Notification_Value, and initiate decrementing of Notification_Timer at a constant rate. The last message is the message received last, or with the latest timestamp.

In some situations, reception of a message will also mean that the user has read the message. For example, if the conversation screen is active in device 102, the event handler 141 may assume that reception of a message signifies also that the user has read the message, even though there is no additional "activation" of device 102. In that case, event handler 141 will first handle the reception of the message as described above, and then will handle the "event" of the user reading the message as described above.

Figure 4:
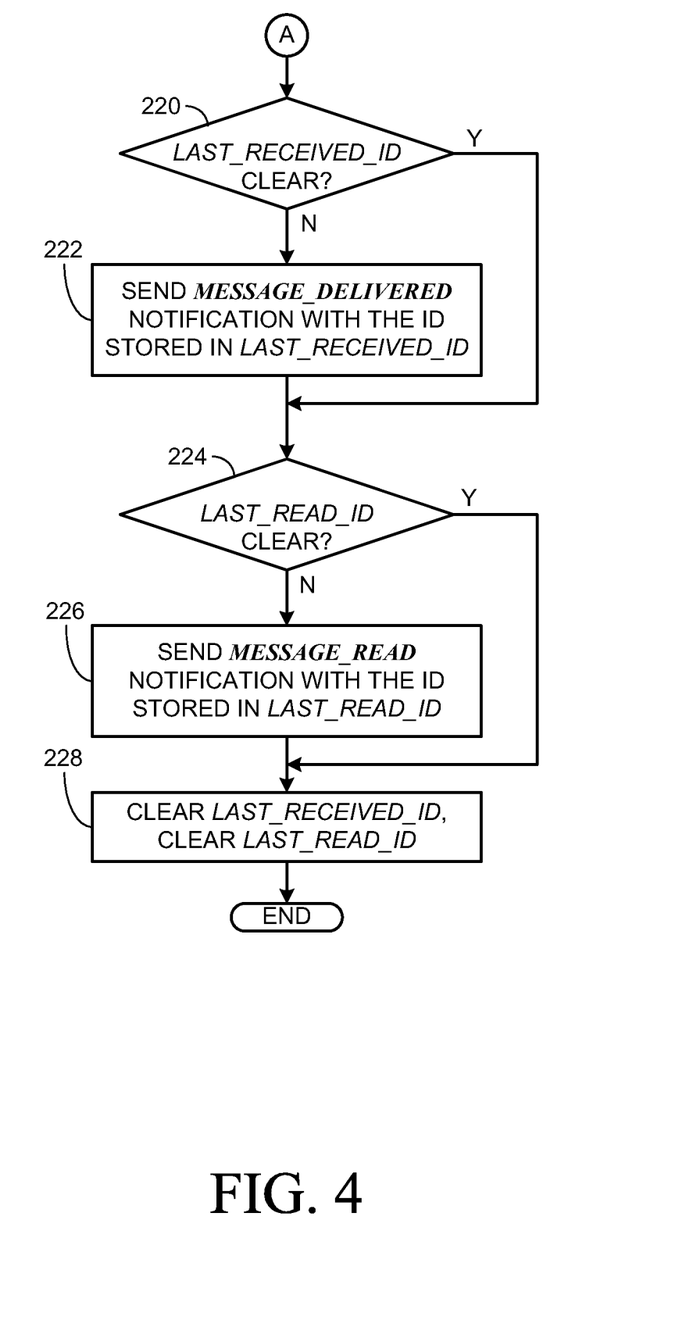

If event handler 141 recognizes at 216 that Notification_Timer is decremented to zero, the method continues to 220 at FIG. 4. If Last_Received_ID contains an ID number of a message, then at 222 IM client 140 may send a Message_Delivered notification that includes the ID number that is stored in Last_Received_ID. At 224, IM client 140 checks whether Last_Read_ID contains an ID number of a message, and if so, then at 226 IM client 140 may send a Message_Read notification that includes the ID number that is stored in Last_Read_ID. At 228, ID client 140 clears Last_Received_ID and Last_Read_ID to zero.

Figure 3:
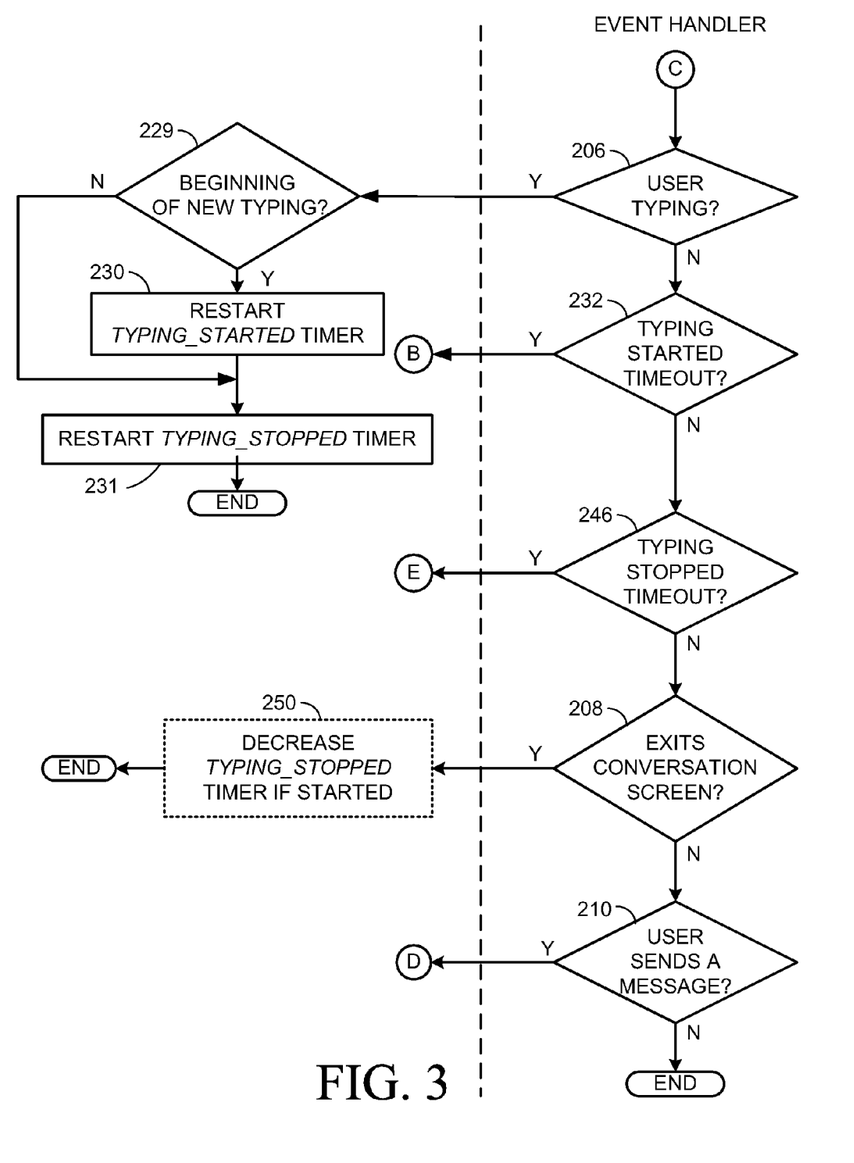

If event handler 141 recognizes at 206 of FIG. 3 an activation of device 102 that corresponds to the user typing a message, then the method proceeds to 229. If IM client 140 detects at 229 that the user has started or restarted to type a message, then at 230, IM client 140 loads Typing_Started_Timer with a value Typing_Started_Value, and initiates decrementing of Typing_Started_Timer at a constant rate. IM client 140 may decide that the user has started or restarted to type a new message if the Typing_Stopped_Timer has been cleared to zero.

At 231, IM client 140 loads Typing_Stopped_Timer with a value Typing_Stopped_Value, and initiates decrementing of Typing_Stopped_Timer at a constant rate.

Figure 5:
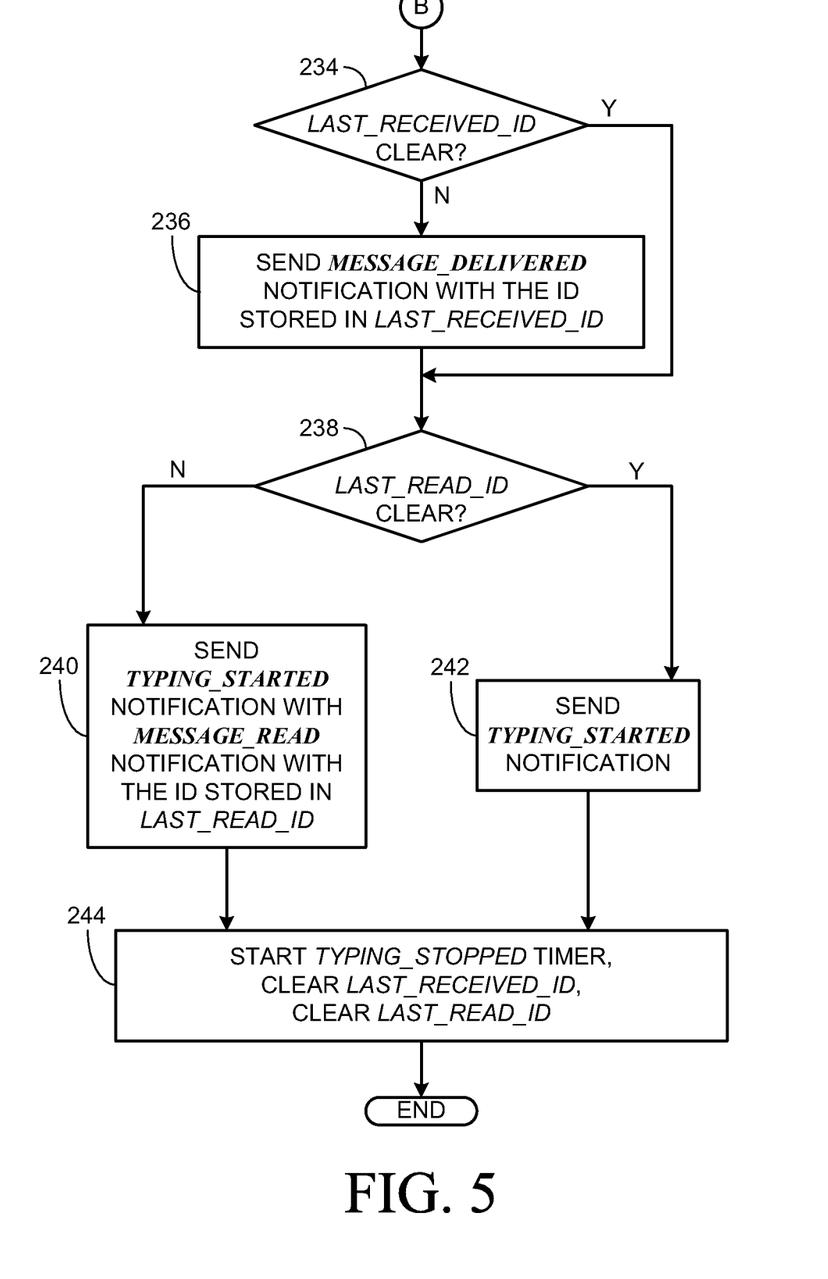

If event handler 141 recognizes at 232 that Typing_Started_Timer is decremented to zero, the method continues to 234 at FIG. 5. If Last_Received_ID contains an ID number of a message, then at 236, IM client 140 may send a Message_Delivered notification including the ID number that is stored in Last_Received_ID. It is rather unlikely that Last_Received_ID will contain an ID number of a message at this point, since it is unlikely that the user of device 102 will have started typing without having read the most recently received message. At 238, IM client 140 checks whether Last_Read_ID contains an ID number of a message. If Last_Read_ID contains an ID number of a message, then at 240 IM client 140 may send a single notification that is a combination of a Typing_Started notification and of a Message_Read notification that includes the ID number that is stored in Last_Read_ID. If Last_Read_ID is cleared, at 242 IM client 140 may send just a Typing_Started notification. At 244, IM client 140 may clear Last_Received_ID and Last_Read_ID to zero, load Typing_Stopped_Timer with a value Typing_Stopped_Value, and initiate decrementing of Typing_Stopped_Timer at a constant rate.

Figure 7:
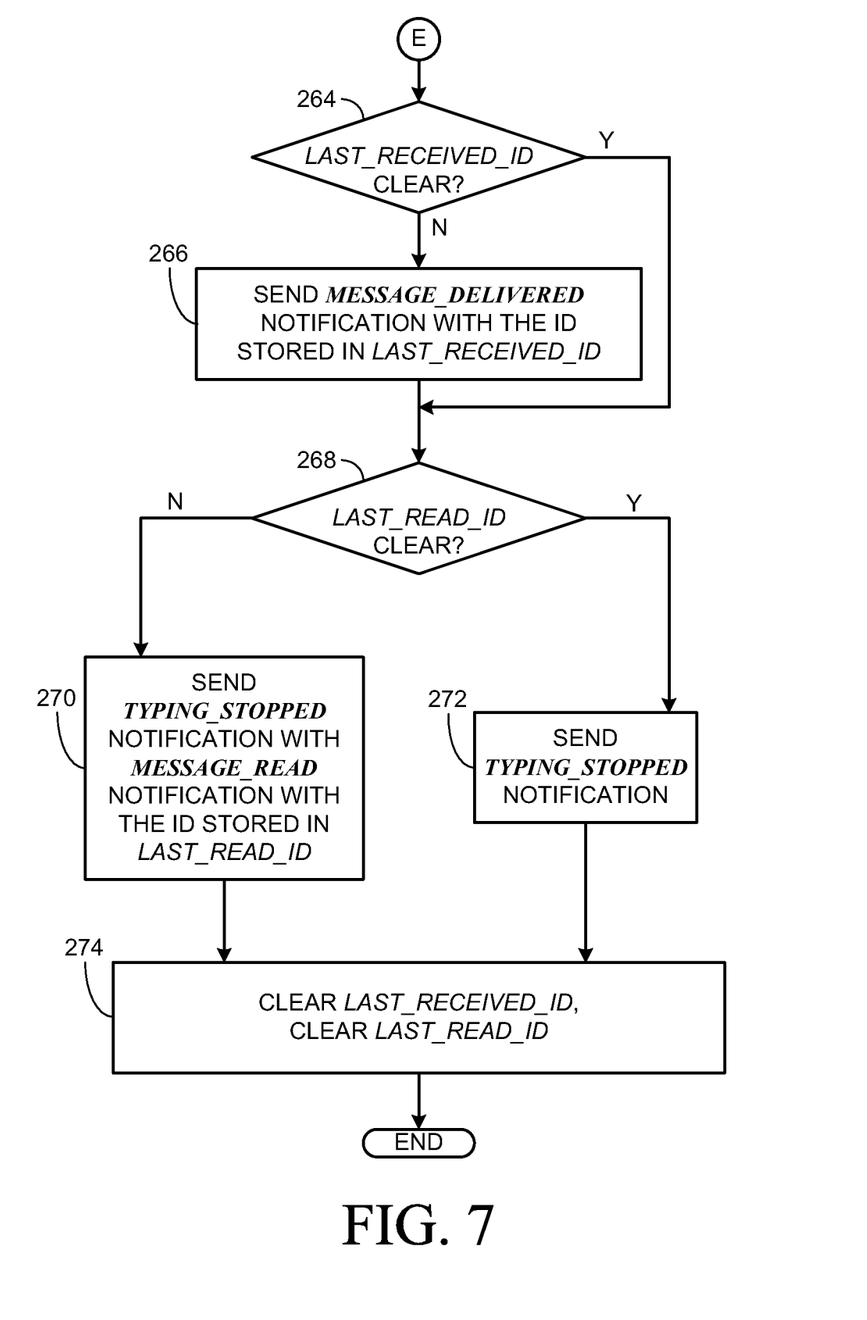

If event handler 141 recognizes at 246 in FIG. 3 that Typing_Stopped_Timer is decremented to zero, the method continues to 264 at FIG. 7. If Last_Received_ID contains an ID number of a message, then at 266, IM client 140 may send a Message_Delivered notification including the ID number that is stored in Last_Received_ID. It is rather unlikely that Last_Received_ID will contain an ID number of a message at this point, since it is unlikely that the user of device 102 will have stopped typing without having read the most recently received message. At 268, IM client 140 checks whether Last_Read_ID contains an ID number of a message. If Last_Read_ID contains an ID number of a message, then at 270 IM client 140 may send a single notification that is a combination of a Typing_Stopped notification and of a Message_Read notification that includes the ID number that is stored in Last_Read_ID. If Last_Read_ID is cleared, at 272 IM client 140 may send just a Typing_Stopped notification. At 274, IM client 140 may clear Last_Received_ID and Last_Read_ID to zero.

If event handler 141 recognizes at 208 an activation of device 102 that corresponds to the user exiting the conversation screen of the received message, then at 250, IM client 140 may optionally decrease the value currently in Typing_Stopped_Timer to shorten the time until Typing_Stopped_Timer is decremented to zero.

Figure 6:
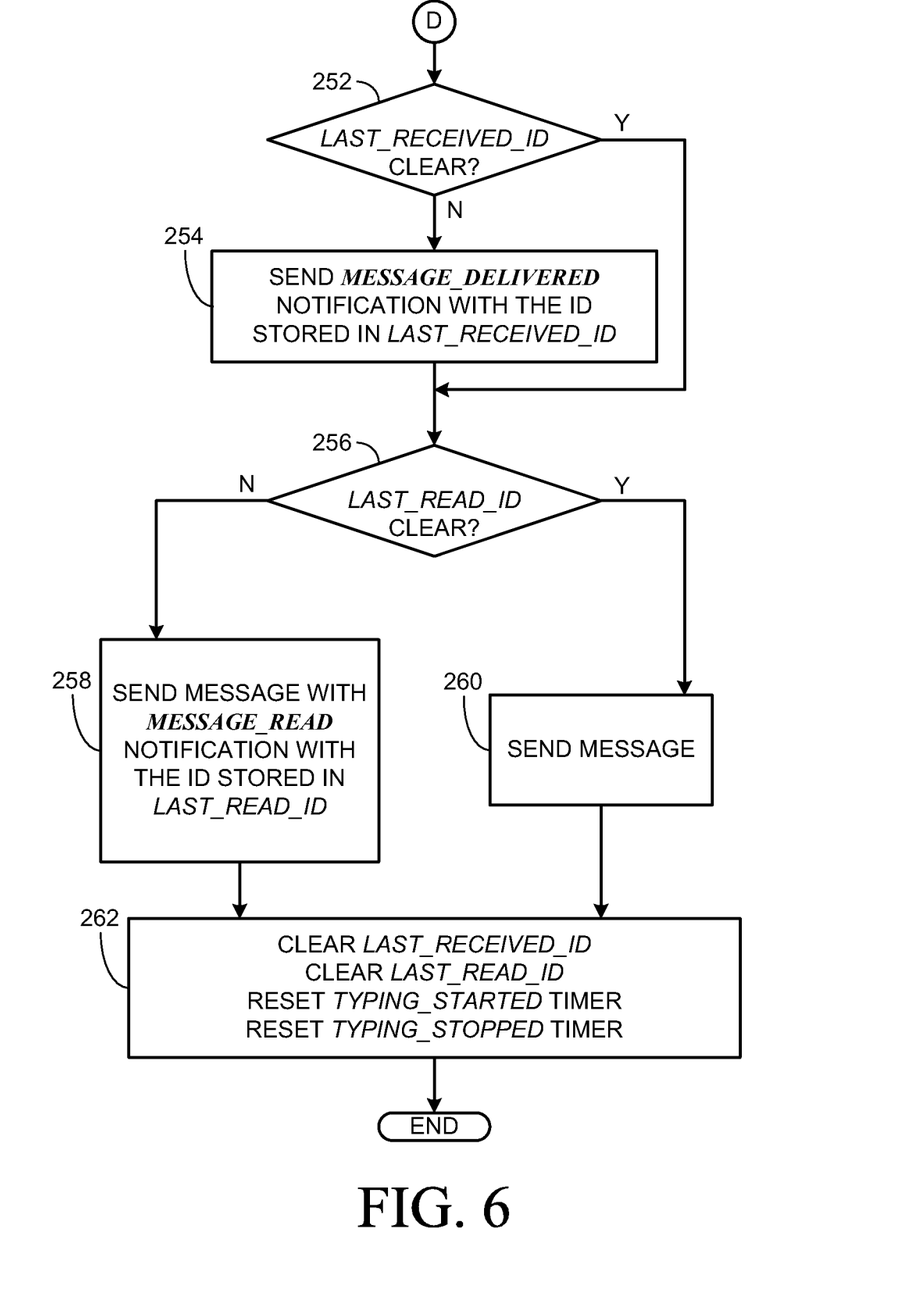

If event handler 141 recognizes at 210 an activation of device 102 that corresponds to the user sending a message, the method continues to 252 at FIG. 6. If Last_Received_ID contains an ID number of a message, then at 254, IM client 140 may send a Message_Delivered notification including the ID number that is stored in Last_Received_ID. It is rather unlikely that Last_Received_ID will contain an ID number of a message at this point, since it is unlikely that the user of device 102 will have replied to the most recently received message without having read it. At 256, IM client 140 checks whether Last_Read_ID contains an ID number of a message. If Last_Read_ID contains an ID number of a message, then at 258, IM client 140 may send the response to the received message combined with a Message_Read notification that includes the ID number that is stored in Last_Read_ID. If Last_Read_ID is cleared, then at 260 IM client 140 may send just the response to the received message. At 262, IM client 140 clears Last_Received_ID and Last_Read_ID to zero, and clears Typing_Started_Timer and Typing_Stopped_Timer.

Figure 8:
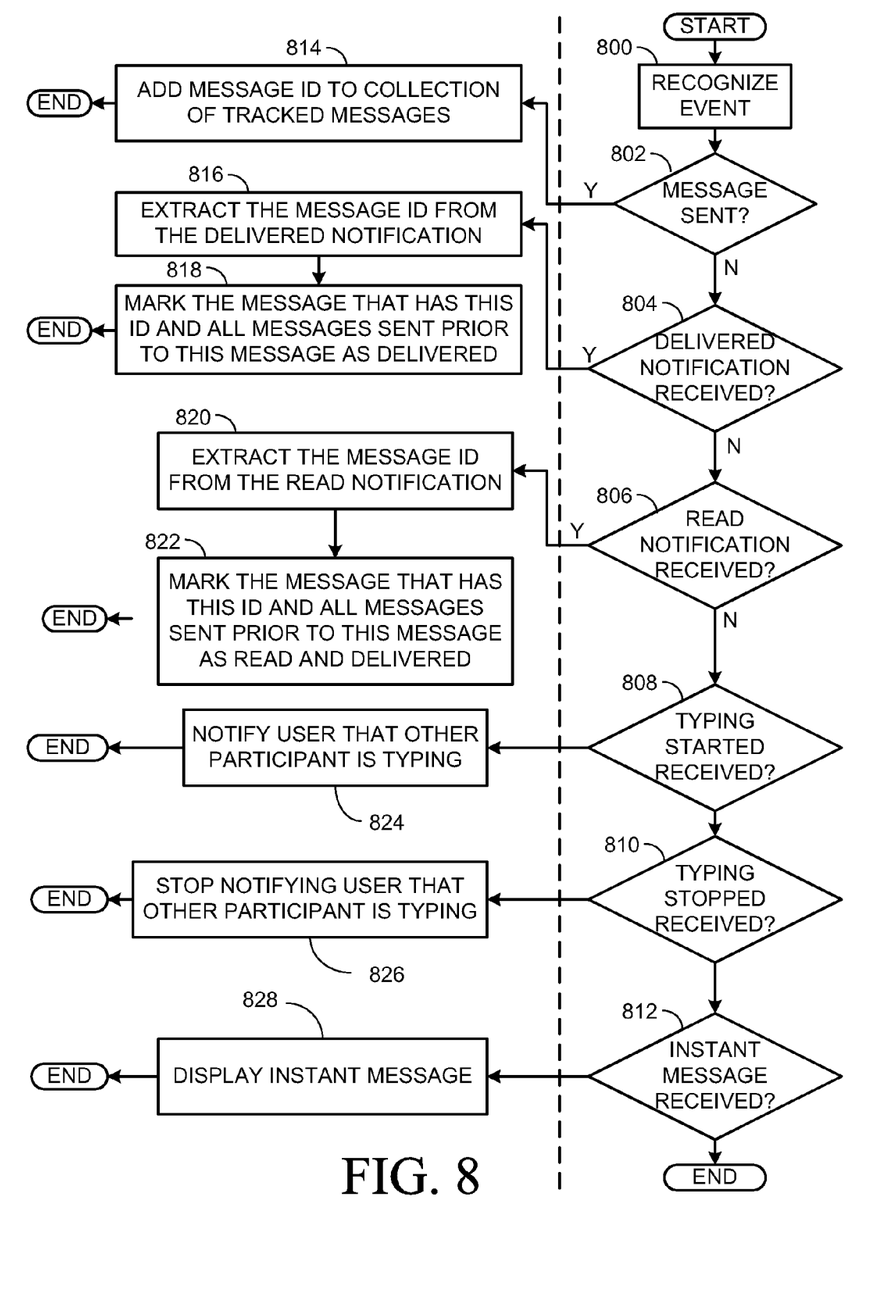
FIG. 8 is a flowchart of an exemplary method implemented by an instant messaging client on a communication device sending one or more IM messages, according to some embodiments of the invention.

FIG. 8 is a flowchart of an exemplary method implemented by IM client 140 on a communication device sending one or more IM messages, for example device 104, according to some embodiments of the invention.

At 800, IM client 140 recognizes that an event occurred at device 104. The recognized event may be sending a message, receiving a Message_Delivered notification, receiving a Message_Read notification, receiving a Typing_Started notification, receiving a Typing_Stopped notification, or receiving an instant message, as shown at 802, 804, 806, 808, 810 and 812, respectively.

IM client 140 track messages included in a conversation. If event handler 141 recognizes at 802 that a message was sent, then at 814, IM client 140 stores the ID number of the sent message. IM client 140 stores ID numbers of sent messages such that the order in which the messages were sent is traceable.

If event handler 141 recognizes at 804 that a Message_Delivered notification was received, then at 816, IM client 140 extracts the ID number of a message embedded in the Message_Delivered notification. At 818, IM client 140 compares the extracted ID number to the collection of tracked messages, and marks the message that has this ID number as delivered. IM client 140 marks also messages of that conversation that were sent prior to the newly marked message as delivered.

If event handler 141 recognizes at 806 that a Message_Read notification was received, then at 820, IM client 140 extracts the ID number of a message embedded in the Message_Read notification. At 822, IM client 140 compares the extracted ID number to the collection of tracked messages, and marks the message that has this ID number as read and delivered. IM client 140 marks also messages of that conversation that were sent prior to the newly marked message as read and delivered.

If event handler 141 recognizes at 808 that a Typing_Started notification was received, then at 824, IM client 140 may notify the user of device 104 that the other participant in the IM conversation is typing. If event handler 141 recognizes at 810 that a Typing_Stopped notification was received, then at 826, IM client 140 may stop notifying the user of device 104 that the other participant in the IM conversation is typing.

If event handler 141 recognizes at 812 that device 104 has received an instant message, then at 828, IM client 140 may display the received instant message to the user of device 104.

Figure 9:
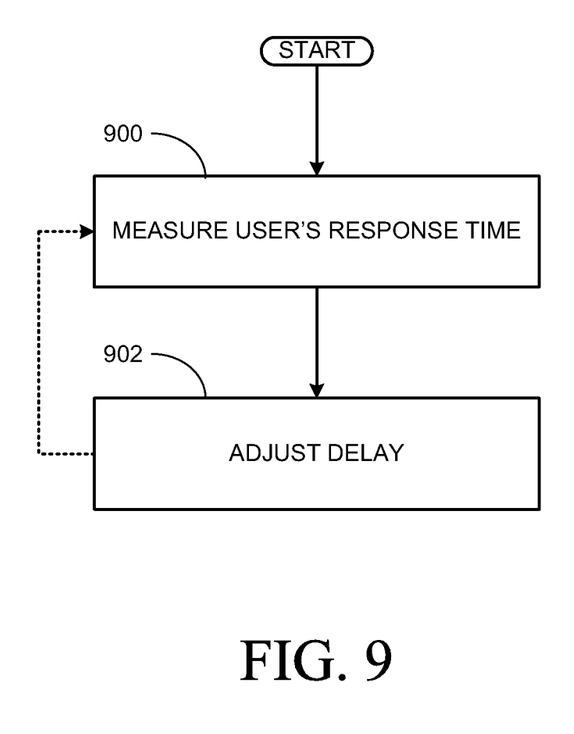
FIG. 9 is a flowchart of an exemplary simplified method implemented by an instant messaging client on a communication device, according to some embodiments of the invention.

FIG. 9 is flowchart of an exemplary simplified method implemented by IM client 140 to optimize values of values Notification_Value, Typing_Started_Value and Typing_Stopped_Value, according to some embodiments of the invention. The value Notification_Value can be selected as a fixed value corresponding to a time delay of, for example, 1-10 seconds.

However, different users have different typical response times and accordingly, the time delays can be configured for specific users. If the time delay is shorter than the typical response time of a particular user, it is likely that in most occasions Message_Delivered notifications will be sent. If the time delay is longer than the typical response time of a particular user, Message_Delivered notifications will likely not be sent, however, there will be an unreasonable delay until the other user receives the Message_Read notifications.

At 900, IM client 140 may measure the user typical response time. The measurement may be done over a period of time and the result according to which IM client 140 adjusts the values at 902 may be, for example, the maximum, minimum, median or average of all measurements, or any other suitable result. Optionally, the method may return to 900 to continue measuring the user's response time.

Figure 10:
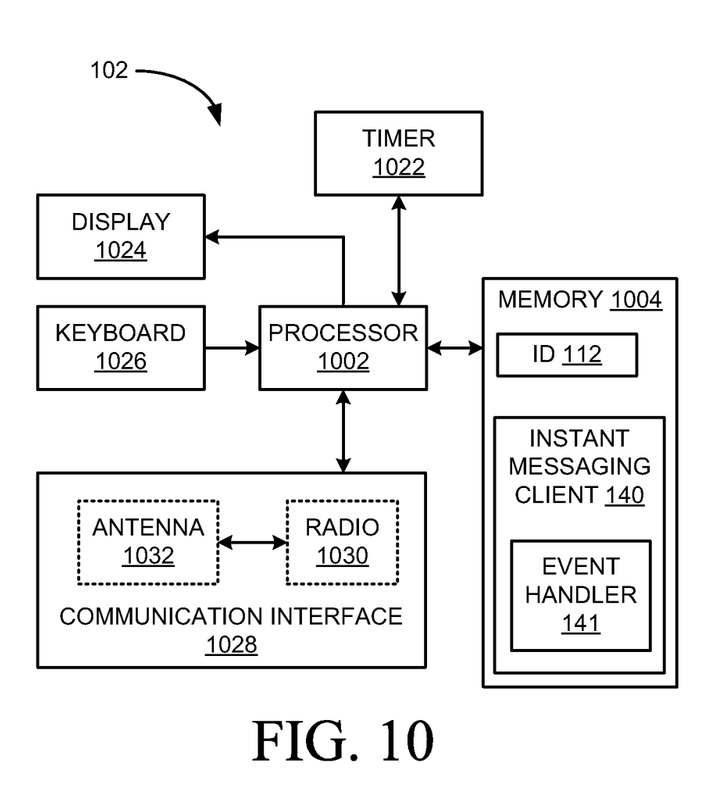
FIG. 10 is a simplified functional block diagram illustration of an exemplary device, according to some embodiments of the invention.

FIG. 10 is a simplified functional block diagram illustration of an exemplary device, for example, device 102, according to some embodiments of the invention. For clarity, some components and features of device 102 are not shown in FIG. 10 and are not described explicitly below. It will be understood that components, modules and coupling elements described in FIG. 10 are functional representations, and that an implementation of device 102 may take any suitable physical form.

For example, two items shown and discussed separately in FIG. 10 may have overlapping parts in a physical implementation or one may be fully embedded in the other. Coupling elements are usually not discussed, and may be implemented using any suitable combination of semiconductor elements, metallic elements, discrete components, wires, optical fibers, connectors, printed circuit boards (PCB), waveguides, open air, and any other suitable elements. Moreover, items shown in FIG. 10 may be physically placed in the same or different enclosures, the same or different PCBs, and/or the same or different semiconductor devices.

Device 102 includes a processor 1002 and a memory 1004 coupled to processor 1002. Memory 1004 stores the unique identifier 112 of device 102 in the IM community, and also stores IM client 140 or the software portion thereof.

Device 102 includes a display 1024 and a keyboard 1026, both coupled to processor 1002, and may include additional user interface components that are not shown in FIG. 10. Keyboard 1026 may be embedded in full or in part within display 1024, i.e. display 1024 may be a "touch screen". A timer 1022 may be controlled by processor 1002, and may be implemented by software, by hardware or by any combination thereof. Timer 1022 may participate in decrementing any of Notification_Timer, Typing_Start_Timer and/or Typing_Stopped_Timer at constant rate.

Device 102 includes a communication interface 1028, coupled to processor 1002, that is able to communicate with network 120. If network 120 is a cellular network or any other type of wireless network, communication interface 1028 may include a radio 1030 and an antenna 1032. Otherwise, if network 120 is a wired network, communication interface 1028 may include other interfacing elements suitable to interact with network 120.

A non-exhaustive list of examples for processor 1002 includes a microprocessor, a microcontroller, a central processing unit (CPU), a digital signal processor (DSP), a reduced instruction set computer (RISC), a complex instruction set computer (CISC) and the like. Furthermore, processor 1002 may comprise more than one processing unit, may be part of an application specific integrated circuit (ASIC) or may be a part of an application specific standard product (ASSP).

Memory 1004 may be fixed in or removable from device 102. Memory 1004 may be coupled to processor 1002 or partly embedded in processor 1002. A non-exhaustive list of examples for memory 1004 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antenna 1032 includes a dipole antenna, a monopole antenna, a multilayer ceramic antenna, a planar inverted-F antenna, a loop antenna, a shot antenna, a dual antenna, an omnidirectional antenna and any other suitable antenna.

A non-exhaustive list of examples for wireless communication standards with which communication interface 1028 may communicate with network 120 includes Bluetooth®, Zigbee™, ultra wideband (UWB), and related or future standards.

Alternatively, communication interface 1028 may comply with one or more of the IEEE 802.11 standards, WiFi Multi Media (WMM), and related or future standards.

It will be obvious to those of ordinary skill in the art how to modify the embodiments described above to suit an instant messaging system supporting Message_Delivered notifications but not supporting any Message_Read notifications. Similarly, it will be obvious to those of ordinary skill in the art how to modify the embodiments described above to suit an instant messaging system supporting Message_Read notifications but not supporting any Message_Delivered notifications.

It will also be obvious to those of ordinary skill in the art how to modify the embodiments described above to suit an instant messaging system in which the network delivers communications out of order. In that case, a Message_Read or Message_Delivered notification must be sent for each message, but a Message_Read notification may still be treated as an implied Message_Delivered notification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a first communication device for reducing communications in an instant messaging conversation between said device and a second communication device, the method comprising:
    receiving, via a communications network, a first instant message from said second communications device at said first communication device;
    detecting a first event associated with a first status at said first communications device for said first instant message;
    determining whether a second event associated with a second status at said first communications device for said first instant message occurs within a determined time duration after said first event; and
    sending after the determined time duration after the first event via said communications network from said first communications device to said second communications device, based on determining that said second event occurs within the determined time duration after said first event, a single status notification that confirms said second status without sending a separate status notification associated with at least said first status, said second status inferring at least said first event.

2. The method of claim 1, wherein said single status notification confirms a plurality of earlier events based on said second status.

3. The method of claim 1, wherein
    said first event is associated with a reception at said first device of said first instant message of said conversation from said second device,
    said second event is associated with a transmission by said first device of a second instant message of said conversation to said second device in reply to said first instant message, and
    said single status notification is a single transmission comprises a combination of said second instant message and a notification of the display of the first instant message on a display of the first device.

4. The method of claim 1, wherein
    said second event is associated with a transmission by said first device of a second instant message of said conversation to said second device,
    said single status notification is provided by sending said second instant message,
    said first event is associated with a starting of input of said second instant message at said first device, and
    wherein the method further comprises sending, after the determined time duration based on determining that said second event did not occur within the determined time duration subsequent to said first event, a status notification associated with at least said first status.

5. The method of claim 1, wherein
    said second event is associated with a transmission by said first device of a second instant message of said conversation to said second device,
    said single status notification is provided by sending said second instant message,
    said first event is associated with a stopping of input of said second instant message at said first device, and
    wherein the method further comprises sending, after the determined time duration based on determining that said second event did not occur within the determined time duration subsequent to said first event, a status notification associated with at least said first status.

6. The method of claim 1, wherein
    said second event is that said first instant message of said conversation was displayed on a display of said first device,
    said single status notification comprises a notification that said first instant message was read, and
    said first event is associated with a receipt of said first instant message at said first device.

7. The method of claim 1, wherein
    said second event is associated with a starting of input of a third instant message of said conversation at said first device,
    said first event comprising at least one of a receipt and a display at said first device of a second instant message of said conversation that was transmitted by said second device to said first device, and
    said single status notification is a single transmission of a combination notification comprising both a notification of said starting of input of said third instant massage and a notification of said at least one of a receipt and a display of said second instant message.

8. The method of claim 1, wherein
    said second event is associated with a starting of input of a third instant message of said conversation at said first device, said first event is associated with a display at said first device of a second instant message of said conversation that was transmitted by said second device to said first device, and said single status notification is a single transmission of a combination notification comprising both a notification of said starting of input of said third instant massage and a notification of said display of said second instant message.

9. The method of claim 1, further comprising sending, after the determined time duration based on determining that said second event did not occur within the determined time duration subsequent to said first event, the separate status notification associated with at least said first status.

10. A non-transitory computer-readable medium having computer-executable instructions which when executed by a first communication device performing operations comprising:

receiving, via a communications network, a first instant message from a second communications device at said first communication device;

detecting a first event associated with a first status at said first communications device for said first instant message;

determining whether a second event associated with a second status at said first communications device for said first instant message occurs within a determined time duration after said first event; and sending after the determined time duration after the first event via said communications network from said first communications device to said communications second device, based on determining that said second event occurs within the determined time duration after said first event, a single status notification that confirms said second status without sending a separate status notification associated with at least said first status, said second status inferring at least said first event.

11. A communication device comprising:
a processor;
a display coupled to said processor;
a keyboard coupled to said processor;
a timer in communication with said processor;
a communication interface capable of communicating with a cellular network and coupled to said processor, said communication device being able to communicate with another communication device by way of said communication interface and said cellular network; and
a memory coupled to the processor, said memory to store code which, when executed by said processor, causes said communication device to perform operations comprising:

receiving, via a communications network, a first instant message from said another communications device at said communication device;

detecting a first event associated with a first status at said communications device for said first instant message;

determining whether a second event associated with a second status at said communications device for said first instant message occurs within a determined time duration after said first event; and sending after the determined time duration after the first event via said communications network from said first communications device to said another communications device, based on determining that said second event occurs within the determined time duration after said first event, a single status notification that confirms said second status without sending a separate status notification associated with at least said first status, said second status inferring at least said first event.

12. A method for reducing communications in an instant messaging conversation between a first device and a second device, comprising:

detecting a first instant messaging (IM) event relating to a single instant message received at the first device;

monitoring a time period measured from the detection of the first IM event;

detecting, subsequent to said first IM event, a second IM event relating to said single instant message received at the first device;

transmitting, based on a determination that said time period reaches a predetermined threshold before said detecting the second IM event, a notification of the first IM event via a transmitter in the first device to the second device; and transmitting, based on detecting said second IM event and a determination that said second IM event is detected before said time period reaches said predetermined threshold, a notification of the second IM event via a transmitter in the first device to the second device, without transmitting the notification of the first IM event, the second IM event inferring at least the first IM event.

13. The method of claim 12, wherein the first IM event is receiving an IM communication from the second device, and the second IM event is displaying the IM communication on the first device.

14. The method of claim 12, wherein:
the first IM event is one of receiving a first IM communication from the second device, displaying the first IM communication on the first device, and receiving an indication of typing on the first device in response to the first IM communication; and
the second IM event is transmitting a second IM communication from the first device to the second device.

15. The method of claim 12, wherein the first IM event is displaying the IM communication on the first device, and the second IM event is receiving an indication of typing on the first device in response to the first IM communication.

16. The method of claim 12, wherein the first IM event is receiving an indication of a beginning of typing on the first device in response to the first IM communication, and the second IM event is receiving an indication that typing has stopped.

17. A non-transitory computer readable medium comprising computer executable instructions for reducing communications in an instant messaging conversation between a first device and a second device, comprising instructions for:

detecting a first instant messaging (IM) event relating to a single instant message received at the first device;

monitoring a time period measured from the detection of the first IM event;

detecting, subsequent to said first IM event, a second IM event relating to said single instant message received at the first device;

transmitting, based on a determination that said time period reaches a predetermined threshold before the detecting of said second IM event, a notification of the first IM event via a transmitter in the first device to the second device; and transmitting, based on detecting said second IM event and a determination that said second IM event is detected before said time period reaches said predetermined threshold, a notification of the second IM event via a transmitter in the first device to the second device, without transmitting the notification of the first IM event, the second IM event inferring at least the first IM event.

18. The computer readable medium of claim 17, wherein the first IM event is receiving an IM communication from the second device, and the second IM event is displaying the IM communication on the first device.

* * * * *